United States Patent [19]

Brodersen

[11] Patent Number: 5,170,027
[45] Date of Patent: Dec. 8, 1992

[54] WORKING ENVIRONMENT GLOVE BOX

[75] Inventor: Craig Brodersen, Wallingford, Conn.

[73] Assignee: Jeneric/Pentron Inc., Wallingford, Conn.

[21] Appl. No.: 625,749

[22] Filed: Dec. 11, 1990

[51] Int. Cl.⁵ ............................................. B23K 9/32
[52] U.S. Cl. .................................... 219/72; 219/136; 312/1
[58] Field of Search ............... 219/72, 74, 136; 312/1, 312/31.2

[56] References Cited

U.S. PATENT DOCUMENTS

| | | | |
|---|---|---|---|
| 2,806,271 | 9/1957 | Operhall | 22/200 |
| 2,985,129 | 5/1961 | Kirkpatrick | 219/72 |
| 3,020,389 | 2/1962 | Gorman | 219/72 |
| 3,360,629 | 12/1967 | Bridoux et al. | 219/72 |
| 3,435,878 | 4/1969 | Howard et al. | 164/51 |
| 3,814,259 | 6/1974 | Kamimura et al. | 210/391 |
| 4,254,817 | 3/1981 | Kidowaki et al. | 164/252 |
| 4,280,551 | 7/1981 | Ohara | 164/287 |
| 4,437,710 | 3/1984 | MacFarland et al. | 312/1 |
| 4,492,572 | 1/1985 | Linn | 432/263 |
| 4,568,809 | 2/1986 | Linn | 219/10.41 |
| 4,627,482 | 12/1986 | Waterstrat | 164/514 |
| 4,654,858 | 3/1987 | Rowe | 373/72 |
| 4,700,769 | 10/1987 | Ohara et al. | 164/514 |
| 4,709,741 | 12/1987 | Nakamura | 164/35 |
| 4,768,757 | 9/1988 | Nakamura et al. | 266/252 |
| 4,830,083 | 5/1990 | Nakamura | 164/35 |
| 4,830,823 | 5/1990 | Nakamura | 420/420 |
| 4,919,191 | 4/1990 | Brodersen | 164/495 |

OTHER PUBLICATIONS

"A Novel Method For Vacuum Casting Titanium" by Hruska, The International Journal of Prosthodontics, vol. 3, No. 2, pp. 142-145.

Advertisement, Castmatic-S Automatic Caster discloses use of Argon gas, Invateni International Cooperation.

Advertisement, CYCLARC.

Advertisement, OHARRA Pure Titanium Casting System by Kitamara, Ohara Co. Ltd.

*Primary Examiner*—Clifford C. Shaw
*Attorney, Agent, or Firm*—Perman & Green

[57] ABSTRACT

A glove box for establishing an inert gas working environment. The glove box has a housing defining a work chamber and a stovepipe section. Flexible glove sections are connected to the housing and can be inserted into the work chamber. A valve is connected to the stovepipe section for exiting gas from the work chamber and stovepipe section. The valve includes a rigid member with a seal connected thereto. The rigid member is biased by elastic members onto the stovepipe section with the seal therebetween.

17 Claims, 1 Drawing Sheet

WORKING ENVIRONMENT GLOVE BOX

BACKGROUND OF THE INVENTION

1. Field of the Invention

The present invention relates to enclosed working environments and, more particularly, to a glove box apparatus and method of establishing and maintaining a nonreactive work environment.

2. Prior Art

Enclosed working environments and particularly glove boxes are known in the art. In the field of dentistry, glove boxes are used to rework metallic castings such as with the cutting, welding and brazing of titanium and titanium alloy bridges and the like. These glove boxes have an electrode inside a working chamber, a suitable power plant that can be connected to a supply of electricity, and means for conduiting inert gas into the working chamber.

Various problems exist with prior art glove boxes. One problem that exists is that prior art glove boxes do not adequately remove all reactive gases from the working chamber. A failure to remove all reactive gases, such as oxygen, hydrogen, nitrogen, etc., can contaminate the workpiece during cutting, brazing or welding.

Another problem that exists with prior art glove boxes is that the glove boxes are virtually always used in conjunction with a casting apparatus. Both of these apparatus, casting and glove box, are provided with separate power plants, whereas, when both apparatus are available at one location, only one power plant is necessary to supply power to both apparatus. Thus, glove boxes in the prior art were unnecessarily expensive due to inclusion of an unnecessary power plant when the power could be provided by the power plant in the casting apparatus.

Another problem that exists with prior art glove boxes is that no suitable enclosed housing and vent valve has been provided for easy use.

It is therefore an objective of the present invention to provide a new and improved glove box apparatus and method of establishing and maintaining a nonreactive work environment that overcomes problems in the prior art as well as provide additional features.

SUMMARY OF THE INVENTION

The foregoing problems are overcome and other advantages are provided by a new and improved glove box and method of establishing and maintaining a nonreactive work environment.

In accordance with one embodiment of the present invention, a glove box is provided comprising a housing, flexible glove sections, and a valve. The housing defines a work chamber with a first aperture at one end, a second aperture at a second end, and a stovepipe section extending up from the work chamber. The flexible glove sections are fixedly connected to the housing at its ends with each of the glove sections enclosing one of the apertures. The valve is connected to the stovepipe section for exiting gas from the work chamber and stovepipe section.

In accordance with embodiment of the present invention, a glove box is provided comprising a frame, flexible gloves, and an exhaust valve. The frame defines a working chamber and an exhaust conduit. The flexible gloves are fixedly connected to the frame and are extendible into the work chamber through the apertures in the frame. The exhaust valve is connected to the exhaust conduit and comprises a substantially rigid member and a seal fixedly connected thereto. The valve is movable relative to the conduit and comprises means for biasing the valve in a first position to prevent gases from exiting and entering the conduit and, is movable to a second position by gas pressure from inside the conduit to allow gas to exit the conduit. The means for biasing includes at least one elastic member connecting the rigid member with a portion of conduit.

In accordance with one method of the present invention, a method of establishing and maintaining a substantially enclosed inert gas work environment is provided. The method includes the steps of providing a glove box working unit having a frame with a working chamber, gloves connected to the frame, the gloves being insertable into the working chamber through apertures in the frame and enclosing the apertures, an exhaust conduit with a check valve, means for supplying inert gas into the work chamber, and a working tool in the work chamber. The method includes inserting inert gas into the work chamber, the gloves expanding outward due to pressure from the inert gas and air in the working unit; purging gases from the glove box working unit comprising inserting the gloves into the work chamber, the movement of the gloves displacing gases in the working unit out the check valve, and allowing inert gas flowing into the work chamber to push the gloves back out from the work chamber, at least partially; and repeating the purging step at least one more time such that air in the work chamber is replaced by inert gas.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
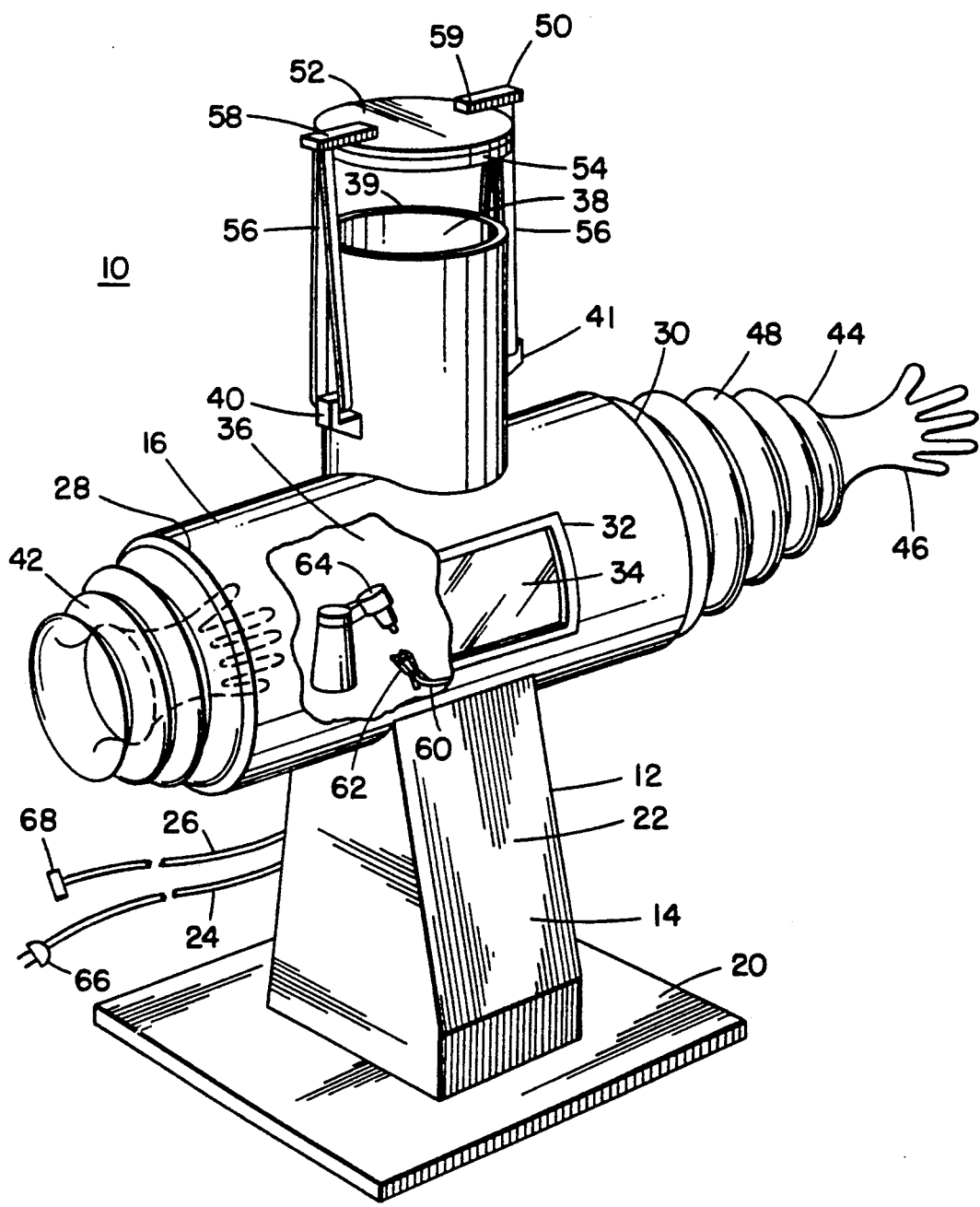
FIG. 1 is a perspective view of a glove box having a cut away section incorporating features of the present invention.

Referring to FIG. 1, there is shown a perspective view of a glove box 10 incorporating features of the present invention. As used herein, the term "glove box" is intended to include an enclosed environment in which an operator can preform operations or tasks with his hands through means of at least one flexible glove. Although the present invention will be described with reference merely to the one embodiment shown in the drawing, it should be understood that alternate embodiments are possible and that any suitable size, shape or type of elements or materials could be used.

The glove box 10, in the embodiment shown, generally comprises a frame 12 having a pedestal 14, a chamber housing 16, and a chimney or exhaust conduit 18. The frame can be comprised of any suitable material or combination of materials such as metal. The pedestal 14 has a base 20 and stem 22. However, the pedestal 14 need not be provided. The pedestal 14 is generally intended to allow the glove box 10 to be placed on a table top or the like. The stem 22 is generally hollow with the exception of electrical supply conduit 24 and gas supply conduit 26 which will both be described in greater detail below. The chamber housing 16, in the embodiment shown, is generally tubular shaped with a first aperture at first end 28, a second aperture at an opposite second end 30, and a view port hole 32 which has a glass window 34 located therein. However, the chamber housing 16 could have any suitable shape or configuration. In addition, rather than having window 34, the entire chamber housing 16 could be made of transparent material so long as an operator can see into the chamber housing or alternate means are provided to view inside the chamber housing 16. The chamber housing 16 generally establishes a work chamber 36 as shown through the cut away section of the housing. The chimney or stovepipe section 18 is connected to or may be integrally formed with the chamber housing 16 and has a conduit 38 that communicates with the work chamber 36 at one end and has an open second end. In the embodiment shown, the exterior of the stovepipe section 18 also has two hooks 40 and 41.

In the embodiment shown, the glove box 10 has two flexible glove sections 42 and 44. The first glove section 42 is fixedly connected to the chamber housing 16 at the first end 28 and seals off the aperture at the first end 28. The second glove section 44 is fixedly connected to the chamber housing 16 at the second end 30 and seals off the aperture at the second end 30. Each glove section, in the embodiment shown, comprises a hand portion 46 and an accordion portion 48. The glove sections are comprised of suitable flexible material to allow movement thereof.

In the embodiment shown, located on the stovepipe section 18 is a valve 50. The valve 50, in the embodiment shown, generally comprises a lid 52, a seal 54, and elastic members 56. The lid 52 is generally comprised of a rigid plate or disk-like member having two laterally extending posts 58 and 59. The seal 52 is generally comprised of resilient flexible material and is fixedly connected to the underside of the lid 52. The seal 54 is adapted to engage the top surface 39 of the stovepipe section 18 and make a sealing engagement between the lid 52 and stovepipe section 18. The elastic members 56 are adapted to be connected between hooks 40 and 41 on the stovepipe section 18 and the posts 58 and 59 on the lid 52. In a preferred embodiment, the elastic members 56 are removably connected to hooks 40 and 41 and posts 58 and 59 for purposes of removing the lid 52 from the opening to conduit 38 and, replacement of the elastic members. In the preferred embodiment shown, one elastic member 56 is provided between post 58 and hook 40 and, two elastic members are provided between post 59 and hook 41. However, any suitable arrangement or number of elastic members could be provided. In addition, any suitable means for biasing the lid 52 and seal 54 against the top 39 of the stovepipe 18 could be provided. It should also be noted that, in the embodiment shown, the elastic members 56 normally are in tension and hold the lid 52 and seal 54 against the top 39. The lid 52 and seal 54 are shown away from the top 39 for illustrative purposes only.

Located in the work chamber 36, in the embodiment shown, is a ground wire 60 with a connector or clip 62 for attachment to a workpiece (not shown). Also located in the work chamber 36 is an electrode working tool 64 adapted to cut, weld, and braze a workpiece made of metallic material. The ground wire 60 and clip 62 are provided to complete an electrical circuit such that electricity can travel between the ground wire 60 and electrode 64 through the workpiece. The electrode 64 and/or workpiece can be manipulated to preform the desired operation. The electrical wire to the electrode 64 and the grounding wire 60 both pass through an aperture in the chamber housing 16 into the stem 22 of the pedestal 14. A suitable seal or grommet is provided to seal the wire aperture. The wires extend out of the stem 22 and form electrical conduit 24 that terminates at connector 66. The electrode 64 generally requires direct current to function properly, thus the connector 66 is adapted to be removably connected to a source of direct current. Preferably, the source of direct current is a metallic casting apparatus having a DC transformer, but the glove box may be connected to a separate power plant.

The gas supply conduit 26 has a suitable connector 68 for removably connecting the conduit 26 to a source of inert or nonreactive gas such as argon or helium. In a preferred embodiment, the gas supply conduit is connectable to the gas supply of a metallic casting apparatus, but may be connected to its own gas supply. One example of a metallic casting apparatus is described in copending patent application Ser. No. 07/614,713 filed Nov. 16, 1990 assigned to the same assignee as herein which is hereby incorporated by reference in its entirety. The gas supply conduit 26 passes through the pedestal stem 22 and into the work chamber 36. In the embodiment shown, the electrode working tool 64 has suitable means for connecting the gas conduit 26 thereto and allow gas to flow into the work chamber 36. A flow control device (not shown) may be provided with the electrode working tool 64 and/or elsewhere. In an alternate embodiment, the gas conduit 26 need not terminate at the electrode working tool 64, but may terminate elsewhere in the work chamber 36 or at the interior wall of the chamber housing 16.

The operation and use of the glove box 10 will now be described. As described above, in the field of dentistry, castings are made of titanium and titanium alloys. In some circumstances these casings need to be reworked in order to be suitably sized and shaped to preform their intended function or fit inside a cavity or the like. Because of the highly reactive nature of titanium and titanium alloys at high temperatures to reactive gases and elements such as hydrogen, oxygen, carbon, etc., the reworking of the casting should be conducted in a nonreactive atmosphere of inert gas. Thus, this is the purpose of the glove box; to provide an enclosable work area that can be purged of reactive gas and nonetheless allow an operator the ability to cut, weld and braze workpieces.

Once a workpiece or casting has been identified as needing to be reworked, the operator can either remove the lid 52 from the stovepipe 18 or move it aside from the top opening to the conduit 38. The operator can then place the workpiece through the stovepipe 18 into the work chamber 36 and attach the ground wire 60 to the workpiece via the clip 62. With the workpiece in the work chamber 36 and grounded, the lid 52 can be replaced or reseated. The elastic bands 56 bias the lid 52 against the top 39 with the seal 54 therebetween to seal off the stovepipe 18. With the valve 50 positioned in this closed position, and there being no other open apertures to the interior of the chamber housing 16, the sealed work chamber 36 is established.

Because of the presence of air in the work chamber 36, having reactive gases such as oxygen and nitrogen, the work chamber 36 must be purged with inert nonreactive gas before any reworking of the workpiece should be commenced. In order to accomplish this, inert gas is supplied through the gas conduit 26 into work chamber 36. As the inert gas is supplied, because the work chamber 36 is closed, gas pressure in the work chamber 36 increases. This increase in gas pressure causes the flexible gloves 42 and 44 to expand outward. The operator can observe the extension of the gloves and, when complete, can at least partially purge or remove the combined air and inert gas mixture from the work chamber by pushing on the gloves 42 and 44 and inserting the gloves into the work chamber 36. The movement of the gloves displaces gases in the conduit 38 and work chamber 36 through the valve 50. Basically, the gas pressure on the lid 52 causes the elastic members 56 to stretch and allows the lid 52 to move away from the top 39, at least temporarily. This allows gases to flow out the stovepipe 18 between the lid 52 and top 39. Upon completion of moving the gloves 42 and 44 inward, gas pressure on both sides of the lid 52 equalizes and the elastic members 56 once again close the lid onto the top 39 to close the valve. The operator can allow new incoming inert gas to fill the work chamber again, pushing the gloves 42 and 44 out again, are repeat the purging step. In a preferred method, the purging step is repeated about ten times to insure full removal of all reactive gases and elements from the work chamber before reworking commences.

Once the replacement of air with inert gas is completed, the operator can place his hands in the hand portions 46 (basically inverting the gloves) such that he can handle the workpiece and electrode 64 in the work chamber 36 to rework the workpiece. A suitable foot pedal (not shown) can be provided such that the operator can control the flow of electricity to the electrode without removing his hands from the glove box 10. In a preferred method, because the operators hands are moving in the work chamber 36 and gloves 42 and 44 are moving, a constant supply of inert gas is supplied to the work chamber 36 to compensate for any gas that might be pushed out the valve 50. In addition, because of the stovepipe design, hot gases are allowed to vent out the valve 50 providing a more comfortable working environment for the operator's hands. In an alternative embodiment of the invention, the glove box 10 can be connected to a source of vacuum, such as a vacuum pump, rather than using the gloves 42 and 44 to pump gases out of the work chamber 36.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A glove box comprising:
   a housing defining a work chamber with a first aperture at one end and a second aperture at a second end, and a stovepipe section extending up from said work chamber;
   flexible glove sections fixedly connected to said housing at said ends, each of said glove sections enclosing one of apertures; and
   a valve connected to said stovepipe section for exiting gas from said work chamber and stovepipe section.

2. A glove box as in claim 1 wherein said housing comprises a view port.

3. A glove box as in claim 1 wherein said housing comprises a pedestal.

4. A glove box as in claim 1 further comprises an electrode working tool inside said work chamber.

5. A glove box as in claim 4 further comprising means for removably connecting said tool to a source of electricity.

6. A glove box as in claim 1 further comprising means for removably connecting said work chamber to a source of inert gas.

7. A glove box as in claim 1 wherein said valve comprises a seal on a rigid top adapted to engage a top aperture of said stovepipe section in a closed position and adapted to at least partially move away from said stovepipe aperture in an open position.

8. A glove box as in claim 7 wherein said rigid top and seal are adapted to be moved away from said stovepipe aperture by an operator to position a work piece in said work chamber through said stovepipe section.

9. A glove box as in claim 1 wherein said valve comprises at least two elastic members connected between a flapper member of said valve and a portion of said housing.

10. A glove box comprising:
    a frame defining a work chamber and an exhaust conduit;
    flexible gloves fixedly connected to said frame and extendable into said work chamber through apertures in said frame; and
    an exhaust valve connected to said exhaust conduit, said valve comprising a substantially rigid member and a seal fixedly connected thereto, said valve being movable relative to said conduit and comprising means for biasing said valve in a first position to prevent gases from exiting and entering said conduit and being movable to a second position by gas pressure inside said conduit to allow gas to exit said conduit, said means for biasing including at least one elastic member connecting said rigid member with a portion of said conduit.

11. A glove box as in claim 10 wherein said means for biasing comprises two elastic members connected to one side of said rigid member and one elastic member connected to an opposite side of said rigid member.

12. A glove box as in claim 10 wherein said rigid member comprises at least one post extending laterally out from said rigid member for connecting said elastic member to.

13. A glove box as in claim 12 wherein said frame comprises at least one hook section for connecting said elastic member to.

14. A glove box as in claim 10 further comprising an electrode working tool inside said work chamber.

15. A glove box as in claim 14 further comprising means for removably connecting said tool to a source of electricity.

16. A glove box as in claim 15 further comprising means for removably connecting said work chamber to a source of inert gas.

17. A method of establishing and maintaining a substantially enclosed inert gas work environment comprising:
    providing a glove box working unit having a frame with a work chamber, gloves connected to the frame, the gloves being insertable into the work chamber through apertures in the frame and enclosing the apertures, an exhaust conduit with a check valve, means for supplying inert gas into the work chamber, and a working tool in the work chamber;

inserting inert gas into the work chamber, the gloves expanding outward due to pressure from the inert gas and air in the working unit;

purging gases from the glove box working unit comprising inserting the gloves into the work chamber, the movement of the gloves displacing gases in the working unit out the check valve, and allowing inert gas flowing into the work chamber to push the gloves back out from the work chamber, at least partially; and repeating the purging step at least one more time such that air in the work chamber is replaced by inert gas.

* * * * *